Aug. 1, 1950  P. J. NILSEN  2,517,407
FLASH SYNCHRONIZER FOR CURTAIN SHUTTER CAMERAS
Filed Oct. 12, 1946  2 Sheets-Sheet 1
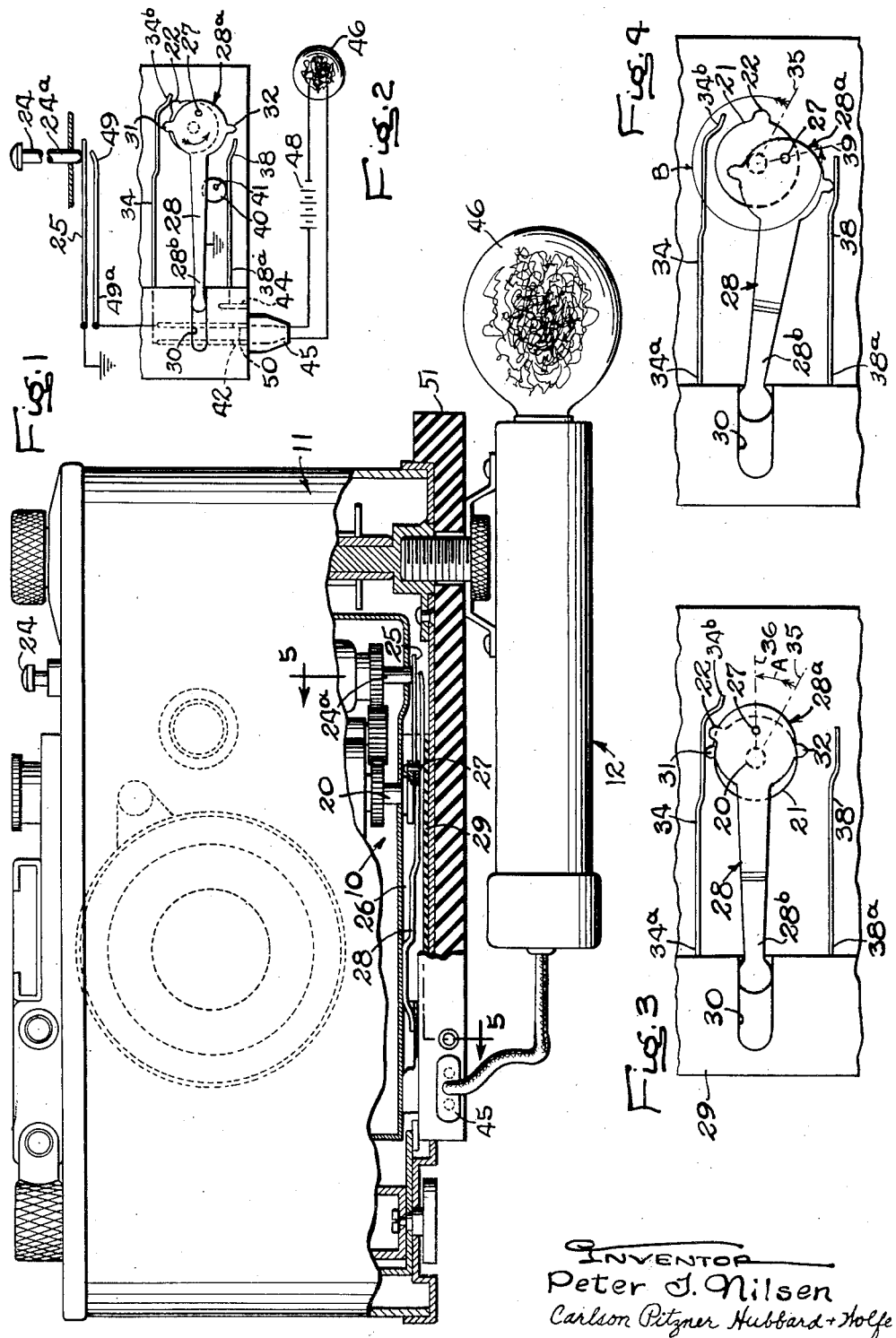
INVENTOR
Peter J. Nilsen
Carlson Pitzner Hubbard + Wolfe
ATTORNEYS Aug. 1, 1950  P. J. NILSEN  2,517,407
FLASH SYNCHRONIZER FOR CURTAIN SHUTTER CAMERAS
Filed Oct. 12, 1946  2 Sheets-Sheet 2
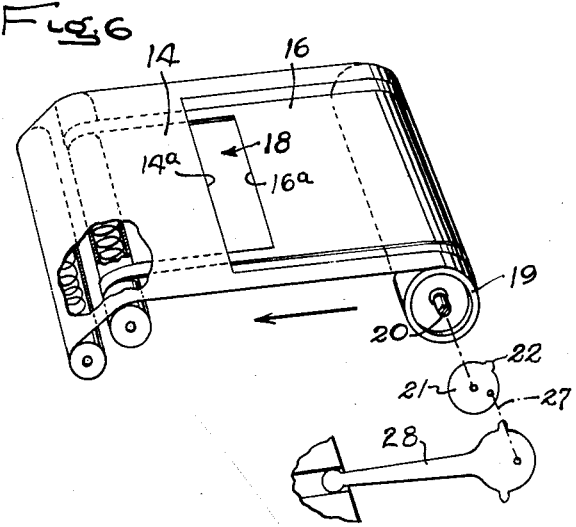
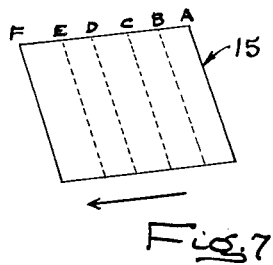
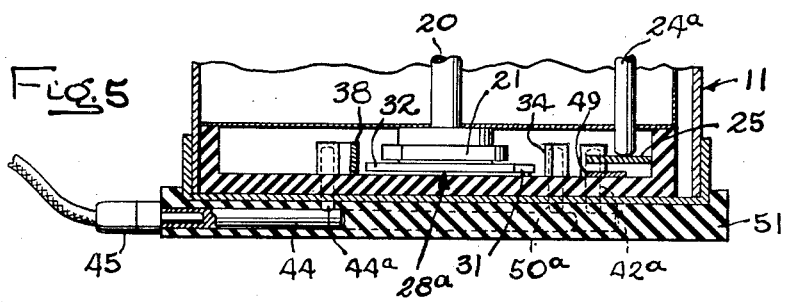
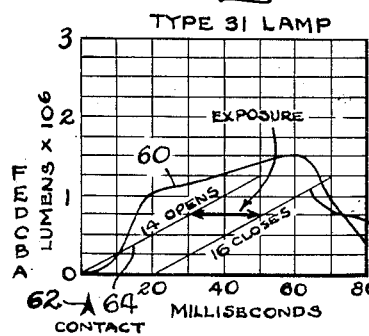
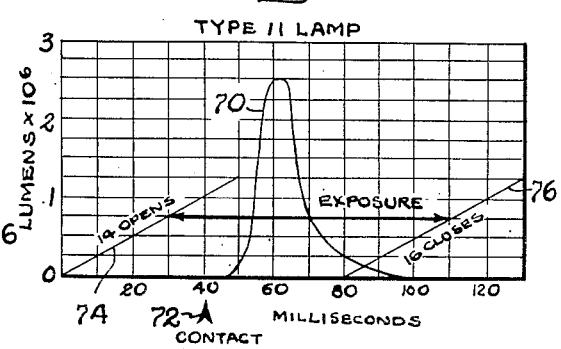
INVENTOR
Peter J. Nilsen
Carlson Pitzner Hubbard + Wolfe
ATTORNEY Patented Aug. 1, 1950

2,517,407

UNITED STATES PATENT OFFICE 2,517,407

FLASH SYNCHRONIZER FOR CURTAIN SHUTTER CAMERAS

Peter J. Nilsen, Oak Park, Ill.

Application October 12, 1946, Serial No. 703,049

9 Claims. (Cl. 95—11.5)

The present invention relates to synchronizers for flash photography and more particularly to synchronizers adapted for mechanical coupling to a focal plane shutter.

It is an object of the invention to provide an improved synchronizer for use with cameras having a focal plane shutter and which includes electrical contacts positively coupled to the shutter so as to be actuated when the shutter reaches a predetermined position thereby eliminating the personal error associated with prior art synchronizers. It is a more specific object to provide in a synchronizer a movable contact member which is so constructed and arranged that frictional and inertia forces are reduced to a minimum but which nevertheless produces a positive contact substantially unaffected by wear or the presence of dirt or corrosion.

It is another object of the invention to provide a synchronizer attachment of a construction particularly well adapted for use with the Leica type camera and which may be made sufficiently small so as to fit within the camera housing. Installation may be readily accomplished with practically no modification of the camera itself, and the synchronizer when installed is not only completely concealed but does not affect in any way the calibration of the shutter or the use of the camera for normal non-flash photography.

It is a further object to provide a focal plane type of synchronizer which is flexibly adapted for use both with long-peaked flash lamps and with short-peaked flash lamps and which includes provision for easily and quickly changing from one type of lamp to the other. An allied object is to provide a synchronizer in which both types of flash lamps are energized using a common set of moving parts but in which adjustment of the timing for each type of lamp may be acomplished completely independently.

It is still another object to provide a synchronizer attachment of improved construction which may be accurately adjusted and the synchronization confirmed merely by a stop-motion inspection of the mechanical parts and without the necessity for photographic tests or the use of a time-consuming trial and error test procedure.

It is a still further object to produce a synchronizer which includes means for preventing the firing of an inserted lamp either during cocking of the shutter or because of shock or vibration in spite of the fact that the synchronizing contacts may be adjusted in a closely spaced relation corresponding to early firing of the lamp.

It is an object to effectuate the advantageous features alluded to above with a synchronizer having a minimum number of parts and which may be constructed of inexpensive material requiring very little machining or accurate bench work.

Other objects and advantages of the invention will become apparent from the following detailed description taken in connection with the accompanying drawings, in which:

Figure 1 is a view in elevation of a Leica type camera and flash gun with the lower edge of the camera in partial section to reveal a synchronizing attachment constructed in accordance with my invention.

Fig. 2 is a plan view of the synchronizer attachment shown in Fig. 1 with the associated electrical circuit illustrated schematically.

Fig. 3 is an enlarged stop-motion view of the attachment of Fig. 2, but showing the actuation of the contact utilized for long-peaked flash lamps.

Fig. 4 is a stop-motion view similar to Fig. 3 but showing the actuation of the contact utilized for short-peaked flash lamps.

Fig. 5 is an enlarged sectional end view taken along the line 5—5 of Fig. 1 and showing the manner in which the electrical contacts from the flash gun are brought into the camera case.

Fig. 6 shows a typical focal plane shutter and associated curtain roller to which my improved synchronizer may be attached.

Fig. 7 shows a rectangle of film and the direction in which it is progressively uncovered by the shutter of Fig. 6.

Fig. 8 discloses a curve of light output for a typical long-peaked flash lamp with a selected period of exposure indicated thereon.

Fig. 9 discloses a light output curve of a short-peaked flash lamp and showing the correspondingly increased period of exposure.

While the invention is susceptible of various modifications and alternative constructions and uses, I have shown in the drawings and will herein describe in detail one embodiment of the invention. It is to be understood, however, that I do not intend to limit the invention by such disclosure but aim to cover all modifications and alternative constructions and uses falling within the spirit and scope of the invention as expressed in the appended claims.

Many types of synchronizers have been worked out for synchronizing an electrically fired flash lamp with a between-the-lens type of shutter. The problem there is relatively simple since substantially all of the film is exposed at the same instant and over the same period. This is not true in the case of cameras using focal plane shutters in which the film is exposed by moving a curtain having a slit of greater or less width past it at a relatively slow speed. As a practical matter with such cameras it has been necessary to restrict flash photography to the use of long-peaked lamps or, where short-peaked lamps must be used, to employ the well-known but unsatisfactory "open flash" technique. In the latter three distinct manual steps are necessary: opening the shutter, flashing the bulb, and closing the shutter.

Prior art synchronizers for focal plane flash photography have suffered from so many disadvantages that very few are in actual use. In the first place they have been applicable only to large cameras and their size and complexity has required them to be factory installed at the expense of considerable modification of the camera, such installation being completely beyond the ability of the average camera enthusiast or repairman. Also, because of the inertia of the added components and the frictional forces therein, installation has incurred the danger that shutter calibration may be changed. In addition, prior synchronizers have not been readily adaptable for use with both long-peaked and short-peaked flash lamps.

The above disadvantages have been overcome and a number of important additional changes derived by application of the teachings disclosed herein. Referring more particularly to the drawing, Fig. 1 shows an improved synchronizer of my design indicated generally at 10 mounted within a camera 11. This camera will be recognized as a "candid" camera of the well-known Leica type. Detachably mounted along one side of the camera is a flash gun 12.

Since the synchronizer is particularly well-adapted to this type of camera, it will be helpful to point out some of its more important mechanical features and characteristics. The focal plane shutter with which this camera is equipped is shown in greater detail in Fig. 6 where it will be noted that such shutter consists of a "leading" curtain 14 having a leading edge 14a which progressively exposes a rectangle of film 15 (Fig. 7). Lying flatly adjacent the curtain 14 is a "following" curtain 16 having a following edge 16a which progressively moves across the film to end the exposure. Associated with the curtains referred to is a spring drive and timing mechanism which will not be described. Suffice it to say that two modes of operation are possible. In the first mode, the leading curtain 14 may completely expose the film rectangle before the following curtain 16 begins to move. In the second mode of operation, and where shorter exposures are desired, the following curtain 16 may be adjusted to start across the focal plane shortly after the leading curtain 14 has started. Since both curtains move at the same speed (normally covering the field in 50 milliseconds), the second mode of operation causes a focal plane to be swept by a slit 18 of substantially constant width.

As shown in Fig. 6, the leading curtain 14 is rolled on a curtain roller 19 having a shaft 20 which rotates at all times in unison with the positioning of the leading curtain. In the Leica type camera, this shaft terminates in a small disk 21 having a cam-like projection 22 as a result of which the disk 21 is known as the "cam." The projecting portion 22 engages a rather stiff decelerating spring (not shown) for slowing up the curtain at the end of its travel. In accordance with one aspect of my invention, the projecting portion 22 is utilized to prevent accidental firing of the flash lamp due to shock or virbration as will later appear. The shutter on this make of camera is tripped by a shutter release plunger 24 (Figs. 1 and 2) having an end portion 24a which engages a flat plunger return spring 25 utilized as an electrical interlock. It will be noted that the end 24a of the release plunger and the cam 21 are both conveniently located in a chamber 26 within the lower edge of the camera housing. Although the space in the chamber 26 is extremely limited, nevertheless it has been found that a synchronizer of my design may be incorporated therein without the necessity of replacing any part of the housing.

In accordance with my invention synchronization is effected by a movable contact member driven by the curtain roller, one or more fixed contacts being placed at predetermined points in its path of movement to enable synchronized firing of the several types of flash lamps. In the present instance, this is accomplished by a movable contact member or blade 28 having a widened out head portion 28a lying flatly adjacent the cam 21 and an elongated extension 28b which is arranged longitudinally within the camera housing but restrained against bodily rotation. The movable member 28 is pivotally mounted on the cam 21 by means of a projection in the form of a crank pin 27 which is eccentric with respect to the axis of the curtain roller shaft 20. To receive the end 28b of the contact member and to support the necessary fixed contacts, I provide a wafer-like insulating block 29 which is channeled out (see for example Fig. 3) and dimensioned to be snugly received in the chamber 26 within the side wall of the camera. A groove 30 machined within the insulating block allows reciprocating movement of the end 28b of the movable member. Since the head portion 28a is eccentrically driven, the movable member 28 moves with an orbital translatory motion in the manner of a connecting rod.

On the laterally extending edges of the head portion 28a of the movable member are movable contacts 31, 32, respectively, which in the present instance are integrally formed. To cooperate with the contact 31, I employ a fixed contact consisting of a leaf spring 34 which lies alongside the movable member 28 and is securely fastened within the insulating block 29 at its end portion 34a.

Although the movable contact 31 is initially separated from the fixed contact 34, as shown in Fig. 2, it will be apparent that movement of the curtain roller will cause the contact 31 to be brought upwardly into actuating engagement with the fixed contact 34. This condition is illustrated in Fig. 3, the initial angular position of the curtain roller being indicated at 35 and the instantaneous position upon the making of contact being indicated at 36. Thus the curtain roller 19 must execute a small angle A before contact takes place, such movement occurring in unison with the movement of the shutter curtain 14.

It is of interest to note at this point that engagement between contact 31 and the fixed contact blade 34 is of a wiping nature thereby enabling the movable contact 31 to cut through any deposit of dirt or corrosion on the contact blade 34. It is also of interest to observe that the additional angular movement of the curtain roller beyond the position shown in Fig. 3 produces an increasingly favorable mechanical advantage and thus very little torque is required from the curtain roller to positively actuate the contacts 31, 34. A still further advantage of this construction is that the contacting force is applied to the edge of the member 28 in the direction of maximum stiffness, enabling exceedingly light gage metal to be employed and therefore the inertia to be reduced to a minimum.

As a precautionary measure and to insure that contacts 31, 34 are not engaged upon subjecting the camera to shock or vibration, it has been found desirable to bend the end of the contact leaf 34 downwardly as at tab 34b so that it engages the projecting portion 22 of the cam 21. The condition which exists prior to the tripping of the shutter is shown in Fig. 2 where it will be noted not only that a relatively large initial spacing exists between contacts 31, 34 but that it is impossible because of the bent over portion 34b for the contacts to come into accidental engagement. It will be apparent to one skilled in the art that the elements 22, 34b, which perform a blocking function, should be electrically insulated from one another. In operation, very slight movement of the cam is normally effective to disengage the projecting portion 22 and to lower the contact leaf 34 into a position in which it will be engaged by the movable contact 31. The point at which contact engagement takes place may be adjusted by changing the shape of tab 34b or by bending the contact leaf 34 inwardly or outwardly with respect to the movable contact although other alternative adjusting means may be used without departing from my invention.

The contacts 31, 34, being actuated early in the path of movement of the shutter curtain 14, have been found to be ideally suited for firing a long-peaked flash bulb and the resulting coordination between the shutter movement and a typical illumination curve will be later discussed in greater detail. In order to properly fire short-peaked flash lamps, however, it has been found necessary that an electrical contact be made much later in the path of movement of the leading shutter curtain 14. In accordance with one aspect of my invention, I employ the same movable member 28 for actuating a second contact when the shutter curtain reaches a predetermined later position. In the present instance, this is accomplished by a fixed contact consisting of a leaf spring 38 which lies parallel to the actuating member 28 and is secured in such position in the insulating block 29 at its end portion 38a. As shown in Fig. 4, contact 38 is actuated practically at the end of the path of movement of the leading shutter 14, an angle B of somewhat less than 360° being executed by the curtain roller prior to its reaching a contact position 39. In the preferred embodiment, the contact spring 38 is accurately positioned by means of an adjusting cam 40 which is rotatable about an off-center pivot point 41. While such adjustment is convenient, it is not absolutely necessary in the practice of my invention since considerable adjustment may be effected (as in the case of contact 34) by properly bending the contact spring itself to cause it to acquire a permanent set.

In view of the foregoing, it will be seen that means has been provided for actuating electrical contacts both at a predetermined first position of the leading curtain and at a predetermined later position. Because of the particular contact arrangement employed, electrical contact may be made using minimum contact pressures and therefore with a minimum mechanical load on the shutter drive mechanism. Furthermore, in spite of the fact that a common movable contact member is employed, it is apparent that adjustment of the fixed contacts may be accomplished completely independently.

In accordance with an aspect of the invention, an electrical circuit is employed in which either of the fixed contacts may be selectively employed and in which provision is made for preventing firing of the flash lamp upon re-cocking of the shutter mechanism. The means employed for accomplishing the above is represented schematically in Fig. 2. Here it will be observed that the "long peak" contact 34 is brought out to a terminal 42 while the "short peak" contact 38 is brought out to a terminal 44. A plug 45 may be used so that either the terminal 42 or the terminal 44 may be placed in series with an external circuit here consisting of a flash lamp 46 and any desired source of current, for example, a battery 48.

In order that the contacts 34, 38 may only be effective when the shutter plunger 24 is depressed, an auxiliary contact is used which is actuated by the depression of the plunger. In the present instance, such auxiliary contact is constructed in the form of a contact leaf 49 which lies adjacent the plunger return spring 25 (see Fig. 5) and in the path of movement of the latter. The auxiliary contact 49 is secured in the insulating block 29 at its end 49a and an electrical terminal 50 is brought out adjacent the terminals 42, 44 to which reference has already been made. With the plug 45 inserted as shown, it is apparent that an electrical circuit exists as follows: ground (the camera frame), spring 25, contact 49, terminal 50, battery 48, lamp 46, terminal 42, contact 34, contact 31, and thence to ground through the crank pin 27. Putting the plug 45 in the adjacent position will, of course, cause contact 38 instead of contact 34 to be included in the circuit. A light "pigtail" may be used to connect the movable contact member 28 to the camera frame to electrically by-pass the pin 27 although in practice this has not been found to be necessary.

In order to bring the inner contacts outside the camera case, I prefer to use the structure disclosed in Fig. 5 where it will be seen that the terminals 42, 44 and 50, are embedded in a channel strip 51 of insulating material which forms a part of the flash gun assembly 12. Upwardly extending from the terminals 42, 44 and 50 are pins 42a, 44a and 50a which resiliently engage the ends 34a, 38a and 49a of the contact strips. Appropriate holes must of course be drilled in the adjacent bottom cover of the camera for the admission of the upwardly projecting contact pins.

*Coordination of exposure with illumination curve*

The synchronizing attachment just discussed has been found to be exceedingly well adapted for use with flash lamps having a large variety of intensity-time output curves. In general, however, such curves may be characterized as either long peaked or short peaked, and the use of the synchronizer will accordingly be discussed in connection with the light output curves of typical lamps commercial designated as types 31 and 11 and shown in Figs. 8 and 9 respectively.

Referring first to Fig. 8, it will be seen that the light output curve 60 of a type 31 flash lamp rises rather rapidly to about a million lumens, increases gradually to about a million and a half lumens over an intervals of about 50 milliseconds, and then decreases at a rapid rate. The sustained peak allows time for the slit 18 (Fig. 6) of the shutter to be transported across the film rectangle when the camera has been set for short exposures. Thus, if a setting of twenty milliseconds (one-fiftieth of a second) is used, each portion of the film will be exposed for that length of time, but the total time consumed in the process will be the sum of the transport time and exposure time. That the latter is true will be readily seen by plotting time versus displacement curves 64, 66 (Fig. 8) for the curtains 14 and 16 respectively. The ordinates A to F of the curve correspond to the successive positions A to F (Fig. 7) on the film and in the path of movement of the shutter.

Since the transport time in the case of each of the curtains 14, 16 is (in the case of the Leica) fifty milliseconds, the interval from the time curtain 14 starts to open and the time curtain 16 comes to a stop is seventy milliseconds. As already stated, the period of maximum illumination is only about 50 milliseconds; thus, it is necessary to synchronize the firing of the lamp extremely accurately if both edges (A and F) of the film are to receive adequate illumination. In the example set forth in Fig. 8 it is desirable that contact be made in the firing circuit of the lamp at an accurately predetermined point 62 within very few milliseconds of the time shutter curtain 14 begins to move. The contact-making structure which has been discussed, due to a great extent to its simplicity and absence of inertia and play, has been found ideally suited to give consistent results even under difficult synchronizing conditions such as that described. It is of interest to note that by using a diagram of the type shown in Fig. 8 and for a given condition of synchronization (e. g., that shown) the amount of illumination to which each position on the film is subjected can be readily ascertained. Position D, for example, on the film is exposed between the 30th and 50th millisecond. Thus the illumination to which it is subjected may be determined merely by noting the area under the curve 60 between these time limits. To be sure, at each end (0-20 ms. and 50-70 ms.) the illumination is somewhat reduced but the latitude of the film is generally sufficient to tolerate this condition. Furthermore, reducing the exposure interval from the assumed value of 20 milliseconds to more frequently used intervals of 10 or even 5 milliseconds will bring the curtain edges 14a, 16a (represented by the curves 64, 66) closer together and cause the edges of the film to be better illuminated.

The condition of synchronization using short-peaked lamps and the short peak synchronizing contact 38 is shown in Fig. 9 which includes the light output curve 70 of a type 11 flashlamp. Here practically all of the light is expended in approximately 20 milliseconds, and because of the relatively slow curtain transport speed (50 milliseconds in the Leica), it is not feasible to expose the film 15 through a narrow traveling slit 18. It has been found necessary instead to open the leading curtain 14 practically completely prior to firing the lamp and then to allow the flash to become practically extinguished before causing the following curtain 16 to start to close.

The curtain time-displacement curves corresponding to this desirable condition are designated 74, 76 while 72 indicates the point at which contact 38 is made. This diagram shows clearly that practically all of the light is emitted during the time that the shutter is completely open, namely between the 50th and 80th millisecond. To accomplish the synchronization illustrated, contact must be made in the firing circuit at an exactly predetermined instant, here at the 40 millisecond mark (i. e., with the curtain 14 opened four-fifths of the way) and using an 80 millisecond exposure.

If contact were made too early, position F on the film 15 would be underexposed while tardy contact, on the other hand, would cause position A to be underexposed. It will be apparent to one skilled in the art that the accurate adjustment of synchronization which is afforded by the construction described not only enables the film to be evenly exposed from edge to edge but further enables the total period of shutter operation (here 130 milliseconds) to be kept to a minimum, the latter being of particular importance where the level of natural lighting is high.

Although the settings shown in Fig. 9 are typical of those which may be used with normal wire-filled lamps, such settings may also be used with the more sharply peaked foil lamps. When it is desired to use the type SM lamp which peaks in about 5 milliseconds, it is merely necessary to adjust the contact 38 so that it is actuated when the shutter curtain 14 reaches the end of its travel and is completely open, which adjustment may be effected merely by turning the adjusting cam 40 a slight amount. Using this lamp with my improved synchronizer has the further advantage that the following curtain 16 may be closed approximately 20 milliseconds earlier than shown in Fig. 9 without cutting off any of the light which correspondingly reduces the time that the film is subject to natural illumination.

While the invention has been described in connection with but two selectable contacts, each being susceptible to limited angular adjustment, it will be apparent that my invention is in no way limited to the use of only two contacts but includes in its other aspects the use of one contact or alternatively of more than two selectable and successively actuated by the movable contact member. Nor is the invention limited to the specific means shown for adjusting the positioning of the contacts 34, 38 but also includes alternative adjusting schemes which will appear to those skilled in the art. Also, if desired, the range of such adjusting movement may be increased or decreased without departing from my teachings.

I claim as my invention:

1. A synchronizer for electrically firing a photoflash lamp in timed relation with the movement of a focal plane shutter rolled on a curtain roller comprising, in combination, a pair of electrical contacts adapted to be wired in series with the firing circuit of the photoflash lamp, and means pivoted to an end of the curtain roller eccentrically with respect to the axis of the roller for closing said electrical contacts after a predetermined degree of rotation.

2. A synchronizer for electrically firing a photoflash lamp in timed relation with the movement of a focal plane shutter curtain rolled on a curtain roller comprising, in combination, a movable contact carrying blade arranged at one end of the curtain roller and in a plane which is perpendicular to the axis of the latter, means for pivotally mounting one end of said blade on the end of said curtain roller, said pivotal mounting means being eccentric with the axis of said roller, means restraining the other end of said blade against rotation so that orbital translatory movement is imparted to said blade upon rotation of the curtain roller, a fixed contact for cooperating with the contact on said blade and in the path of movement thereof, and means for connecting said contacts to the firing circuit of a flash lamp.

3. A synchronizer for electrically firing either a long-peaked or a short-peaked photoflash lamp in timed relation with the movement of a focal plane shutter on a curtain roller comprising, in combination, a contact carrying blade bearing a pivot at one end, means for mounting said pivot on said curtain roller at a point spaced from the axis of the latter, means restraining the other end of said blade against rotary motion so that rotation of the curtain roller imparts translatory orbital movement to said blade, contacts on the lateral edges respectively of said blade, stationary contacts cooperating respectively with said blade-carried contacts and arranged so as to be actuated when said shutter is at predetermined positions near the beginning and end respectively of its path of movement, and electrical circuit means including said contacts and enabling a selected one of such contacts to be included in the firing circuit of a flash lamp depending upon whether the lamp is of the long-peaked or short-peaked type.

4. In a photoflash synchronizing attachment for a camera having a focal plane curtain and having a rotatable member driven by the curtain roller, the combination comprising a contact blade adapted to lie flatly adjacent said member and having one end pivoted thereto at a point eccentric with respect to the axis of said member, a mounting block in the housing of said camera and engaging the other end of said blade, and a fixed contact arranged on said mounting block in the path of movement of said blade so that the same is actuated by said blade when said curtain roller reaches a predetermined angular position.

5. In a photoflash synchronizing attachment for a camera having a curtain roller and a rotatable element coupled thereto, the combination comprising a wafer-like mounting block of insulating material adapted for mounting in the camera housing, a movable contact member having its first end eccentrically pivoted on said rotatable element and with its other end extending in the direction of said mounting block, said mounting block having thereon a stationary contact blade extending into the path of movement of the first end of said contact member for completion of an electrical circuit by said movable contact member when the curtain roller reaches a predetermined angular position, said mounting block being so constructed as to provide a shoulder to guide said other end of said movable contact member to restrain it against bodily rotation.

6. In a photoflash synchronizing attachment for a camera having a curtain roller and a rotatable element coupled thereto, the combination comprising a wafer-like mounting block of insulating material for mounting in the space adjacent said element, an edgewise movable contact blade adapted to lie flatly alongside said element and having one end pivoted thereto at a point eccentric with respect to the axis of said element, said mounting block having a channel contained therein for receiving the other end of said blade, a contact on a lateral edge of said blade, and a stationary contact on said mounting block for actuation by the movable contact blade as said element reaches a predetermined angular position.

7. In a flash synchronizing attachment for a camera having a curtain roller and a rotatable element coupled thereto, the combination comprising a light-weight metallic contact blade having a relatively wide head portion and a relatively narrower elongated body portion, means for pivotally connecting said head portion to said rotatable element in flatly adjacent relation and at a point eccentric with respect to the axis of the latter, an insulating mounting block for mounting within said camera in the space adjacent said rotatable element and having a groove therein for receiving the end of the body portion of said blade so that the latter is constrained to translatory orbital movement upon rotation of said cam, first and second elongated contact springs lying adjacent the lateral edges respectively of said contact blade, each of said contact springs having one end mounted in said insulating block and the other end disposed in the path of movement of the head portion of said blade, and electric terminal means whereby electric connection may be made to said contact blade and to said contact springs so that the latter may be selectively employed for firing either a long-peaked or a short-peaked flash lamp.

8. A synchronizer for electrically firing a photoflash lamp in timed relation with the movement of a focal plane shutter rolled on a curtain roller comprising, in combination, a member rotatable in unison with the end of said curtain roller, a pair of electrical contacts adapted to be wired in series with the firing circuit of the photoflash lamp, and a contact member pivoted to said rotatable member eccentrically with respect to the axis thereof for closing said electrical contacts after a predetermined degree of rotation of said roller.

9. A synchronizer for electrically firing a photoflash lamp in timed relation with the movement of a focal plane shutter curtain rolled on a curtain roller comprising, in combination, a movable blade arranged at one end of the curtain roller, means for pivotally mounting one end of said blade adjacent the end of said curtain roller for movement in unison with said roller and eccentrically with respect to the axis thereof, an electrical contact on said blade, means restraining the other end of said blade against rotation so that orbital translatory movement is imparted to said blade upon rotation of the curtain roller, a second contact for cooperating with the contact on said blade and arranged to be in the path of movement thereof, and means for lowering said second contact into engagement with the contact on said blade in timed relation with the advancement of the latter.

PETER J. NILSEN.

REFERENCES CITED

The following references are of record in the file of this patent:

UNITED STATES PATENTS

| Number | Name | Date |
|---|---|---|
| 1,959,596 | Patterson | May 22, 1934 |
| 2,263,045 | Mendelsohn | Nov. 18, 1941 |
| 2,284,486 | Hineline | May 26, 1942 |
| 2,291,190 | Schwarz | July 28, 1942 |
| 2,304,035 | Steiner | Dec. 1, 1942 |